United States Patent
Coelho et al.

(10) Patent No.: US 12,361,389 B2
(45) Date of Patent: Jul. 15, 2025

(54) VEHICLE SHARING SERVICE OPTIMIZATION

(71) Applicant: Volvo Car Corporation, Gothenburg (SE)

(72) Inventors: João Pedro Cavaco Pinto Coelho, Stockholm (SE); Sébastien Gérard Bernard Geffraye, Berlin (GE); Frida Birgitta Schedin, Stockholm (SE); Saroosh Shabbir, Stockholm (SE); Per Jesper Daniel Fredriksson, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 317 days.

(21) Appl. No.: 18/049,948

(22) Filed: Oct. 26, 2022

(65) Prior Publication Data

US 2024/0144195 A1 May 2, 2024

(51) Int. Cl.
G06Q 10/1093 (2023.01)
G06Q 30/0201 (2023.01)
G06Q 50/40 (2024.01)

(52) U.S. Cl.
CPC ..... *G06Q 10/1095* (2013.01); *G06Q 30/0206* (2013.01); *G06Q 50/40* (2024.01)

(58) Field of Classification Search
CPC ............. G06Q 10/1095; G06Q 10/063; G06Q 30/0206; G06Q 50/40
See application file for complete search history.

(56) References Cited

U.S. PATENT DOCUMENTS

| 6,975,997 B1 | 12/2005 | Murakami et al. |
| 10,825,344 B2 | 11/2020 | Belapurkar et al. |

(Continued)

FOREIGN PATENT DOCUMENTS

| CN | 105488697 A | 4/2016 |
| CN | 108536697 A | 9/2018 |

(Continued)

OTHER PUBLICATIONS

Zhu, J. (2006). Using turndowns to estimate the latent demand in a car rental unconstrained demand forecast. Journal of Revenue and Pricing Management, 4(4), 344-353. (Year: 2006).*

(Continued)

*Primary Examiner* — William S Brockington, III
(74) *Attorney, Agent, or Firm* — Amin, Turocy & Watson, LLP

(57) ABSTRACT

Vehicle sharing service optimization (e.g., using a computerized tool) is enabled. For example, a system can comprise a memory that stores computer executable components, and a processor that executes the computer executable components stored in the memory, wherein the computer executable components comprise: an intent grouping component that, using a defined intent grouping algorithm, groups intents of a user into an intent group, wherein the intents comprise respective requests to schedule an appointment to use a vehicle, a demand component that, based on the intents of the intent group and using a defined demand algorithm, determines a demand of the user, wherein the demand comprises one or more parameters representative of a need, of the user, for the vehicle, and an output component that generates an output representative of the demand.

20 Claims, 10 Drawing Sheets

(56) References Cited

U.S. PATENT DOCUMENTS

| | | |
|---|---|---|
| 11,182,840 B2 | 11/2021 | Subramanya et al. |
| 11,182,984 B2 | 11/2021 | Zeira et al. |
| 2015/0294403 A1 | 10/2015 | Chu et al. |
| 2017/0357914 A1* | 12/2017 | Tulabandhula ....... H04W 4/025 |
| 2018/0012148 A1 | 1/2018 | Horng et al. |
| 2018/0091604 A1* | 3/2018 | Yamashita ............. G06Q 50/40 |
| 2019/0340543 A1 | 11/2019 | Gerenstein et al. |
| 2020/0312153 A1 | 10/2020 | Thakur |
| 2020/0380629 A1* | 12/2020 | Monteil ........... G06Q 10/06315 |
| 2021/0042873 A1* | 2/2021 | Li ..................... G06Q 30/0205 |

FOREIGN PATENT DOCUMENTS

| | | |
|---|---|---|
| CN | 110570251 A | 12/2019 |
| CN | 112101557 A | 12/2020 |
| CN | 112837083 A | 5/2021 |
| WO | 2019030221 A1 | 2/2019 |
| WO | 2022/115846 A1 | 6/2022 |

OTHER PUBLICATIONS

Extended European Search Report received for European Patent Application Serial No. 23205644.0 dated Dec. 22, 2023, 9 pages.

* cited by examiner

VEHICLE SHARING SERVICE OPTIMIZATION

TECHNICAL FIELD

The disclosed subject matter relates to vehicle (e.g., a transportation vehicle) sharing service optimization and, more particularly, to user demand determination based on user intent.

BACKGROUND

The cost of vehicle ownership is becoming increasingly expensive due to, for instance, rising maintenance costs, fuel costs, insurance, and depreciation, among other factors. Additionally, cities are becoming increasingly dense, making car storage and parking difficult and costly. Further, each additional vehicle on the road presents an environmental toll, requiring additional raw materials and leading to increased emission output (e.g., during use and during production). Car sharing enables users to reduce or eliminate many of these vehicle-related transportation costs, for instance, by spreading the costs across a plurality of users. Car sharing can also result in fewer cars on the road, less traffic congestion, and more available parking spots in urban areas. However, a successful car sharing service requires maintaining a delicate balance of supply and demand for cars. Existing car sharing solutions tend to significantly overestimate demand and thus over-allocate vehicles in an area, leading to unnecessary cost and waste, and increasing associated service and environmental costs.

The above-described background relating to vehicle sharing service optimization is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products facilitate vehicle sharing service optimization.

As alluded to above, vehicle sharing service optimization can be improved in various ways, and various embodiments are described herein to this end and/or other ends.

According to an embodiment, a system can comprise a memory that stores computer executable components, and a processor that executes the computer executable components stored in the memory, wherein the computer executable components can comprise: an intent grouping component that, using a defined intent grouping algorithm, groups intents of a user into an intent group, wherein the intents comprise respective requests to schedule an appointment to use a vehicle, a demand component that, based on the intents of the intent group and using a defined demand algorithm, determines the demand of the user, wherein the demand comprises one or more parameters representative of a need, of the user, for the vehicle, and an output component that generates an output representative of the demand.

According to another embodiment, a non-transitory machine-readable medium can comprise executable instructions that, when executed by a processor, facilitate performance of operations, comprising: using a defined intent grouping algorithm, grouping intents of a user into an intent group, wherein the intents comprise respective requests to schedule an appointment to use a vehicle, based on the intents of the intent group and using a defined demand algorithm, determining a demand of the user, wherein the demand comprises one or more parameters representative of a need, of the user, for the vehicle, and generating an output representative of the demand.

According to yet another embodiment, a method can comprise: using a defined intent grouping algorithm, grouping, by a system comprising a processor, intents of a user into an intent group, wherein the intents comprise respective requests to schedule an appointment to use a vehicle, based on the intents of the intent group and using a defined demand algorithm, determining, by the system, a demand of the user, wherein the demand comprises one or more parameters representative of a need, of the user, for the vehicle, and generating, by the system, an output representative of the demand.

DETAILED DESCRIPTION

Figure 1:
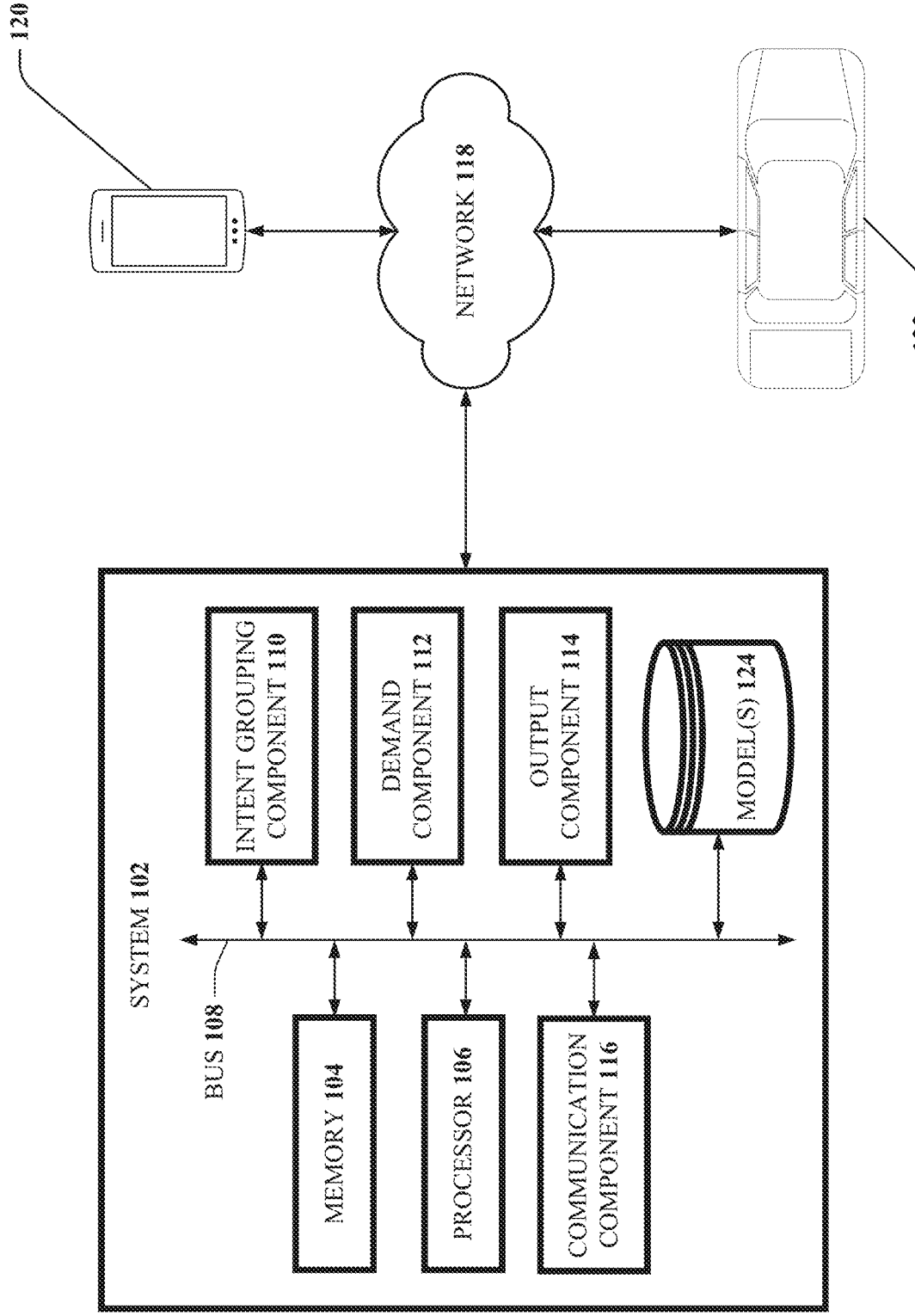
FIG. 1 illustrates a block diagram of an exemplary system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

The computer processing systems, computer-implemented methods, apparatus and/or computer program products described herein employ hardware and/or software to solve problems that are highly technical in nature (e.g., determining and/or executing one or more actions associated with optimization of a vehicle sharing service), that are not abstract and cannot be performed as a set of mental acts by a human.

Conventional vehicle allocation in a vehicle sharing service relies on presenting a user with an overall available supply of vehicles and selection, by the user, of a preferred option. Thus, conventional vehicle allocation systems are unable to differentiate the meaning behind a given intent from that of another (e.g., some users might just browse but never book a car, while others might have an intention to book but are unable to find a car, while still others might find many cars but decide against booking due to prices or similar). By using a demand model described herein, a user that is an active browser (e.g., a user without any true intent to book a car) is weighted not based on the number of intents the user produced, but on the actual underlying need for a vehicle. For example, if ten intents are received and all ten indicate vehicle type A, at location A, at time A, one interpretation could be that there are ten customers who are willing to pay to have vehicle type A, at location A, at time A. However, such a 1-1 mapping of the submitted intents to actual need results in an overestimation of need for a car sharing service, which can lead to more cars in fleet than required, or to move cars to depots where there exists an apparent need, though demand is actually lower. The technical solution described herein enables a more accurate measurement of need of users and/or a customer base for a vehicle sharing service, which yields more accurate metrics for predicting and satisfying future need.

Turning now to FIG. 1, there is illustrated an example, non-limiting system 102 in accordance with one or more embodiments herein. System 102 can comprise a computerized tool, which can be configured to perform various operations relating to vehicle sharing service optimization. The system 102 can comprise one or more of a variety of components, such as memory 104, processor 106, bus 108, intent grouping component 110, demand component 112, output component 114, communication component 116, and/or model(s) 124. In some embodiments, the system 102 can be communicatively coupled to, or can further comprise, network 118, mobile device 120, and/or vehicle 122. In various embodiments, one or more of the memory 104, processor 106, bus 108, intent grouping component 110, demand component 112, output component 114, communication component 116, model(s) 124, network 118, mobile device 120, and/or vehicle 122 can be communicatively or operably coupled (e.g., over a bus or wireless network) to one another to perform one or more functions of the system 102.

In various embodiments, the system 102 can group intents of users. In this regard, the intents can comprise respective requests to schedule an appointment to use a vehicle (e.g., vehicle 122) of a vehicle sharing service associated with a system herein. According to an embodiment, the intent grouping component 110 can, using a defined intent grouping algorithm (e.g., of the one or more model(s) 124), group intents of a user into an intent group (e.g., in a column of a data table such as data table 114 and/or in a memory 104 herein). In various implementations, the intent grouping component 110 can receive or access the intents from one or more users (e.g., from respective mobile devices 120 registered to use the system 102) via a network (e.g., network 118, using a communication component 116). It is noted that, in various embodiments herein, the intents of a user can be received via the mobile device 120 associated with a respective user. In one or more embodiments, a vehicle herein (e.g., vehicle 122) (e.g., a car, sedan, SUV, crossover, sports car, station wagon, coupe, convertible, truck, farm equipment, watercraft, aircraft, train, or another suitable vehicle) can comprise the system 102. In further embodiments, the system 102 can comprise a vehicle (e.g., vehicle 122). According to an implementation, the intent grouping component 110 can group related intents together (e.g., using the defined intent grouping algorithm). For example, the intent grouping component 110 can utilize BigQuery SQL (e.g., using window functions) to compute differences between ordered intents, and then filter on the relevant criteria. In a non-limiting example, criteria utilized in the defined intent grouping algorithm can comprise:

The start differs by more than 195 minutes OR the duration differs by more than 120 minutes, AND the intent doesn't overlap the previous one; or The start differs by less than 195 minutes OR the duration differs by more than 120 minutes, AND the intent overlaps the previous one AND the ratio of durations is higher than 2 or lower than 0.5; or A journey has already been booked for that time.

In other implementations, other criteria can be incorporated into the intent grouping algorithm in order to determine and assign an intent group (e.g., start time and an end time for the appointment, a type of vehicle, a location for the vehicle, a location of the user, newness of a user (e.g., to a respective vehicle sharing platform), etc.). It is noted that, in various embodiments, the communication component 116 can comprise the hardware required to implement a variety of communication protocols (e.g., infrared ("IR"), short-wave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, acoustic waves, ultrasound, L-band, etc.)

In various embodiments described herein, the demand component 112 can, based on the intents of the intent group and using a defined demand algorithm, determine a demand of the user. In this regard, the demand can comprise one or more parameters representative of a need, of the user, for the vehicle (e.g., vehicle 122). It is noted that such parameters can comprise one or more of a start time and an end time for the appointment, a type of vehicle, a location for the vehicle, a location of the user, newness of a user (e.g., to a respective vehicle sharing platform) or another suitable parameter. For example, some users can book out appointments on the same day for an entire year, while other users book five minutes before an intended journey. Such parameters can be captured via intents, however, the demand component 112 determines a demand of a user and/or of an intent group and/or respective parameters, which is more accurate and representative of user need than evaluating user intents individually. Thus, a demand of a user can represent a user's actual need for a vehicle, while intents can comprise a plurality of requests to fill that same need.

According to an embodiment, the output component 114 can generate an output representative of the demand. In this regard, the output can comprise a visualization (e.g., of a data table 414 or a visualization based on data presented in the data table 414) displayed via a graphical user interface of the system 102, mobile device 120, or of a network device communicatively coupled via the network 118 (not depicted in FIG. 1), an audible output rendered via the system 102, mobile device 120, vehicle 122, or another suitable output medium, transmitted via the communication component 116 (e.g., over the network 118), or otherwise rendered. In various embodiments herein, the output component 114 can utilize dbt and/or BigQuery in order to generate a new column in a data table, such as data table 414, comprising the demand(s). In this regard, the system 102 can execute an SQL query via a dbt tool at defined intervals or at other intervals (e.g., determined using machine learning).

Figure 2:
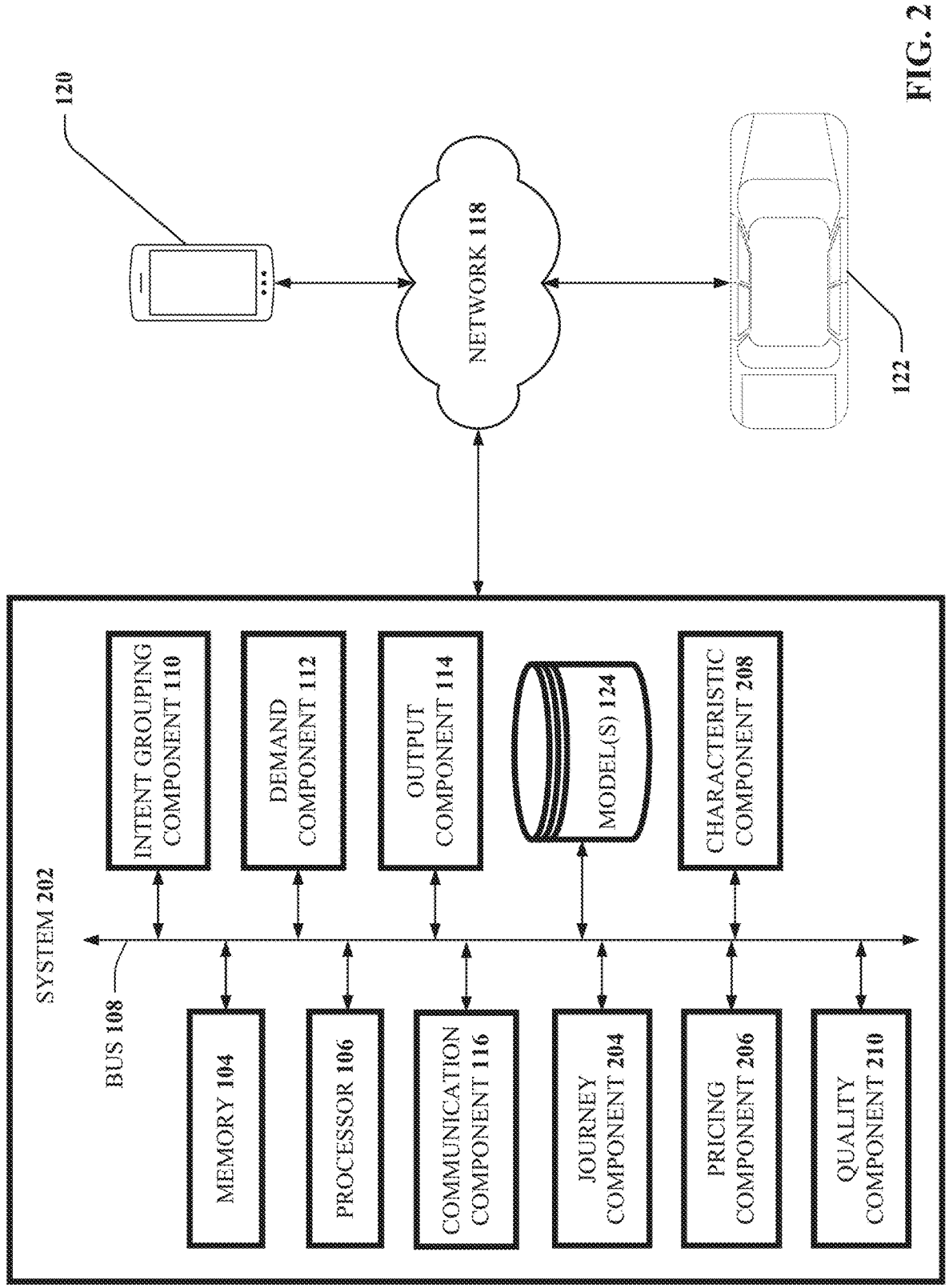
FIG. 2 illustrates a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to vehicle sharing service optimization. The system 202 can be similar to system 102, and can comprise one or more of a variety of components, such as memory 104, processor 106, bus 108, intent grouping component 110, demand component 112, output component 114, communication component 116, and/or model(s) 124. In some embodiments, the system 102 can be communicatively coupled to, or can further comprise, network 118, mobile device 120, and/or vehicle 122. The system 202 can additionally comprise journey component 204, pricing component 206, characteristic component 208, and/or quality component 210. In various embodiments, one or more of the memory 104, processor 106, bus 108, intent grouping component 110, demand component 112, output component 114, communication component 116, model(s) 124, network 118, mobile device 120, vehicle 122, journey component 204, pricing component 206, characteristic component 208, and/or quality component 210 can be communicatively or operably coupled (e.g., over a bus or wireless network) to one another to perform one or more functions of the system 202.

According to an embodiment, the characteristic component 208 can assign a characteristic of an intent, from the intent group, to the demand determined via the demand component 112 (e.g., using the defined demand algorithm). In this regard, the intent can comprise a chronologically first intent from the intent group (e.g., chronologically first for a particular user ID in the data table 414). For example, in data table 414 in FIG. 4b, characteristics of intent 3753 (e.g., start time 2:05, end time 3:00, city A, vehicle start location at main street, vehicle end location at main street) can be applied to demand 1001 by the demand component 112 and/or characteristic component 208. In this regard, the characteristics can comprise one or more of a start time and an end time for the appointment, a type of vehicle, a location for the vehicle, a location of the user, newness of a user (e.g., to a respective vehicle sharing platform) or another suitable characteristic.

According to an embodiment, the journey component 204 can assign a journey resulting from an intent, of the intent group, to the demand. In this regard, the journey component 204 can complete one or more user requests (e.g., intents) to schedule an appointment to use a vehicle (e.g., vehicle 122) of a vehicle sharing service by assigning a journey to a demand. The journey component 204 can thus schedule a particular vehicle, start time, end time, start location, end location, etc. based on one or more demands determined via the demand component 112 for a particular vehicle of a fleet of vehicles (e.g., a fleet of vehicles comprising one or more of vehicle 122), though in other embodiments, the journey component 204 can schedule a particular vehicle, start time, end time, start location, end location, etc. based on one or more intents of user(s). By assigning the journey, the journey component can send (e.g., via the output component 114 and/or communication component 116) information and/or access credentials (e.g., of a vehicle 122) to a mobile device 120 associated with a respective demand for the assigned journey. In an embodiment, the pricing component 206 can, based on a group of demands comprising the demand and using a defined pricing algorithm, determine a price for appointment to use the vehicle 122. For example, the pricing component 206 can analyze the demands (e.g., demands represented in data table 414) and determine prices to assign to journeys for those demands based on the total demand across a fleet of vehicles (e.g., a fleet of vehicles comprising one or more of vehicle 122) (e.g., using the defined pricing algorithm). For instance, the pricing component 206 can set/adjust pricing to schedule a vehicle (e.g., vehicle 122) of a vehicle sharing service associated with a system herein based on determined demands (e.g., via the demand component 112) of one or more users, available vehicles and corresponding vehicle locations, and/or other suitable factors. According to another embodiment, the quality component 210 can determine a dependability metric associated with the demand. By determining dependability metrics associated with demand (e.g., rather than intents alone), performance of a system herein can be determined and evaluated. In an implementation, the dependability metric comprises a ratio of demands to filled appointments. For example, a 1:1 ratio of demands and filled appointments can be indicative of a well-performing system described herein. However, unfulfilled demands can be indicative of an underperforming system described herein.

Figure 3:
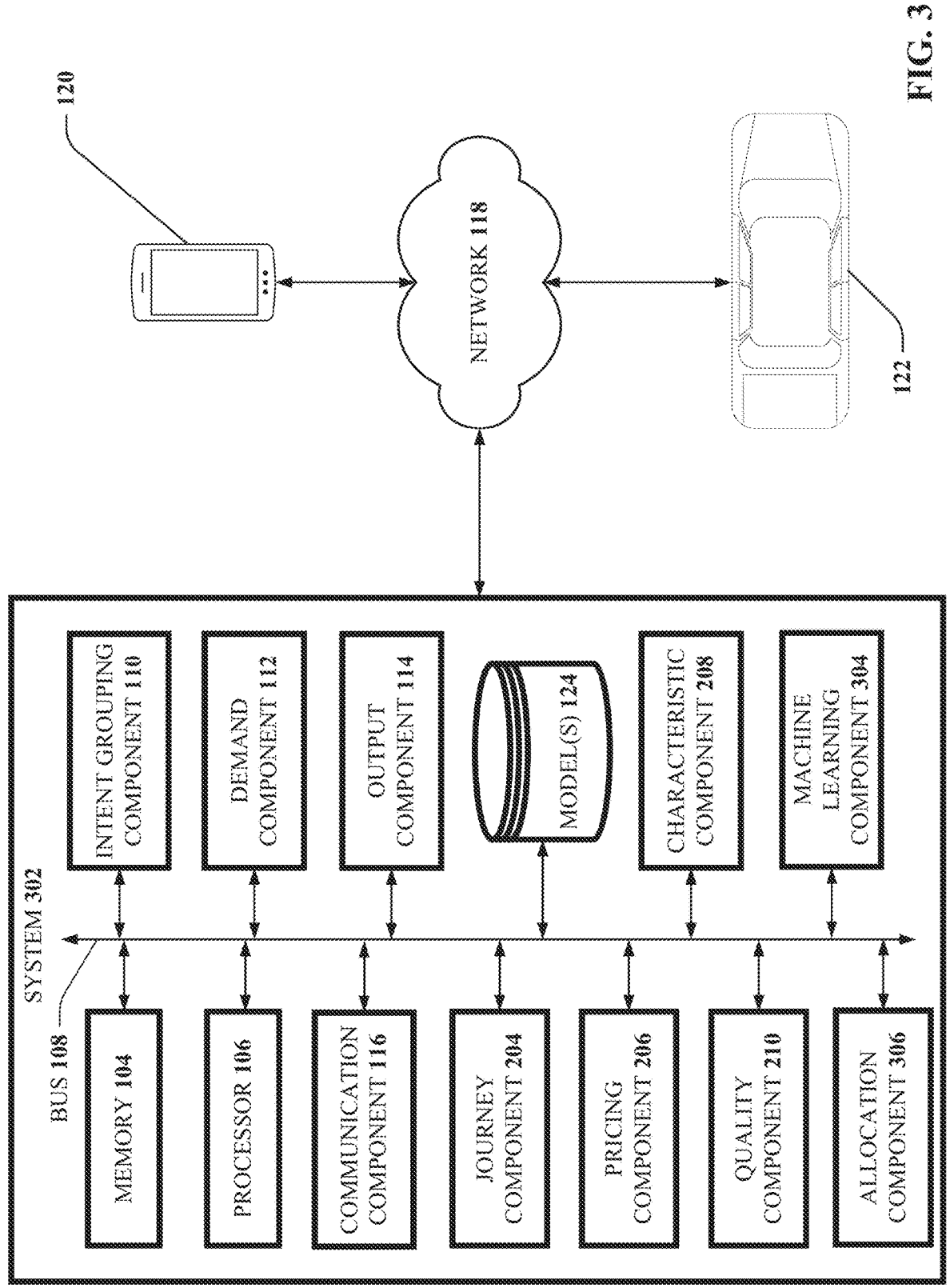
FIG. 3 illustrates a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to vehicle sharing service optimization. The system 302 can be similar to system 202, and can comprise one or more of a variety of components, such as memory 104, processor 106, bus 108, intent grouping component 110, demand component 112, output component 114, communication component 116, model(s) 124, journey component 204, pricing component 206, characteristic component 208, and/or quality component 210. In some embodiments, the system 102 can be communicatively coupled to, or can further comprise, network 118, mobile device 120, and/or vehicle 122. The system 202 can additionally comprise machine learning (M.L.) component 304 and/or allocation component 306. In various embodiments, one or more of the memory 104, processor 106, bus 108, intent grouping component 110, demand component 112, output component 114, communication component 116, model(s) 124, network 118, mobile device 120, vehicle 122, journey component 204, pricing component 206, characteristic component 208, quality component 210, M.L. component 304, and/or allocation component 306 can be communicatively or operably coupled (e.g., over a bus or wireless network) to one another to perform one or more functions of the system 302.

In various embodiments, past intents, demands, parameters, characteristics of past intents users of a system herein, etc. can be stored in memory (e.g., memory 104). The foregoing can be utilized to generate characteristic models that can be utilized in the determination of appropriate characteristics for demands herein. Thus, according to an embodiment, the M.L. component 304 can generate, using machine learning, a characteristic model (e.g., of the model(s) 124) based on past characteristics of past intents of other users, other than the user (and/or past characteristics of past intents of the same user). In this regard, the characteristic component 208 can assign the characteristic of an intent to the demand using the characteristic model (e.g., generated via the M.L. component 304). Similarly, in another embodiment, the M.L. component 304 can generate, using machine learning, a defined intent grouping algorithm based on past intents of other users, other than the user (and/or past characteristics of past intents of the same user). Thus, rather than utilizing static rules to determine intent groups, the M.L. component 304 can generate the defined intent grouping algorithm in order to increase accuracy and refine intent grouping herein. Similarly, in another embodiment, the M.L. component 304 can generate, using machine learning, the defined demand algorithm based on past demands of other users, other than the user (and/or past characteristics of past intents of the same user). Thus, rather than utilizing static rules to determine demand (e.g., first chronological intent), the M.L. component 304 can generate the demand in order to increase accuracy and refine demand determination herein.

According to an embodiment, the allocation component 306 can, based on demands, determine an allocation of vehicles (e.g., comprising the vehicle 122). For example, the allocation component 306 can determine placement of vehicles in a fleet of vehicles both across various cities, and within cities, for various times. In some embodiments, vehicles herein (e.g., vehicle 122) can comprise autonomous vehicles. Thus, the allocation component 306 can send (e.g., via the output component 114 and/or communication component 116) instructions to the autonomous vehicle to cause the autonomous vehicle to move to a designated location and a designated time. In an example, with regard to map 502 of FIG. 5, the allocation component 306 can determine the locations for vehicle 506, vehicle 508, vehicle 510, and respective times to place said vehicles and the locations depicted in map 502. In some embodiments, the M.L. component 304 can, using machine learning based on past allocations of the vehicles, generate an allocation model. In this regard, the allocation component 306 can determine the allocation of vehicles of a vehicle sharing service associated with a system herein using the allocation model. In one or more implementations, the output component 114 can generate a visualization of the allocation (e.g., similar to map 502) which can be displayed via a graphical user interface of the system 102, mobile device 120, or of a network device communicatively coupled via the network 118 (not depicted in FIG. 1), an audible output rendered via the system 102, mobile device 120, vehicle 122, or another suitable output medium, transmitted via the communication component 116 (e.g., over the network 118), or otherwise rendered. In various embodiments, the system 302 can determine user-specific parameters to improve the underlying demand modelling (e.g., via the M.L. component 304). For example, if user X only makes one intent every time user X has a need, but user Y makes 5-6 intents each time user Y has a need (e.g., because user Y likes to explore alternatives), the M.L. component 304 can generate a demand model that can incorporate analysis of user habits in order to determine underlying need more accurately.

It is noted that one or more components herein can leverage artificial intelligence and/or machine learning in order to make various determinations, predictions, data acquisitions, or estimations herein. Further, various defined thresholds herein can be determined using such machine learning (e.g., based on past information). Artificial-intelligence or machine learning systems and techniques can be employed to facilitate learning user behavior, context-based scenarios, load habits, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following. According to an embodiment, the M.L. component 304 can comprise and/or employ an artificial intelligence (AI) model and/or a machine learning (ML) model that can learn to perform the above or below described functions (e.g., via training using historical training data and/or feedback data). In some embodiments, the M.L. component 304 can comprise and/or utilize an AI and/or ML model (e.g., of the model(s) 124) that can be trained (e.g., via supervised and/or unsupervised techniques) to perform the above-described functions using historical training data comprising various context conditions. In this example, such an AI and/or ML model can further learn (e.g., via supervised and/or unsupervised techniques) to perform the above-described functions using training data comprising feedback data, where such feedback data can be collected and/or stored (e.g., in memory 104). In this example, such feedback data can comprise the various instructions described above/below that can be input over time in response to observed/stored context-based information. One or more components herein can initiate an operation based on a defined level of confidence determined using information (e.g., feedback data). For instance, based on learning to perform such functions described above using the above defined feedback data, the M.L. component 304 can determine appropriate corresponding actions. In an embodiment, the M.L. component 304 can perform a utility-based analysis that factors cost of initiating the above-described operations versus benefit. In this embodiment, the M.L. component 304 can use one or more additional context conditions to determine whether any action should be taken. In another embodiment, the M.L. component 304 can perform a utility-based analysis that factors an environmental cost (e.g., carbon emissions or other environmental costs) of initiating the above-described operations versus benefit. In this embodiment, a component herein can use one or more of the additional context conditions to determine whether any action should be taken.

To facilitate the above-described functions, the M.L. component 304 can perform classifications, correlations, inferences, and/or expressions associated with principles of artificial intelligence. Additionally, components herein can enable automatic control (e.g., of a vehicle herein). For instance, components herein can employ an automatic classification system and/or an automatic classification. In one example, the M.L. component 304 can employ a probabilistic and/or statistical-based analysis (e.g., factoring into the analysis utilities and costs) to learn and/or generate inferences. The M.L. component 304 can employ any suitable machine-learning based techniques, statistical-based techniques and/or probabilistic-based techniques. For example, a component herein can employ expert systems, fuzzy logic, support vector machines (SVMs), Hidden Markov Models (HMMs), greedy search algorithms, generative adversarial networks, rule-based systems, Bayesian models (e.g., Bayesian networks), neural networks, other non-linear training techniques, data fusion, utility-based analytical systems, systems employing Bayesian models, and/or the like. In another example, the M.L. component 304 can perform a set of machine learning computations. For instance, the M.L. component 304 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, ensemble learning operations, voting classifiers, and/or a set of different machine learning computations.

Figures 4A, 4B:
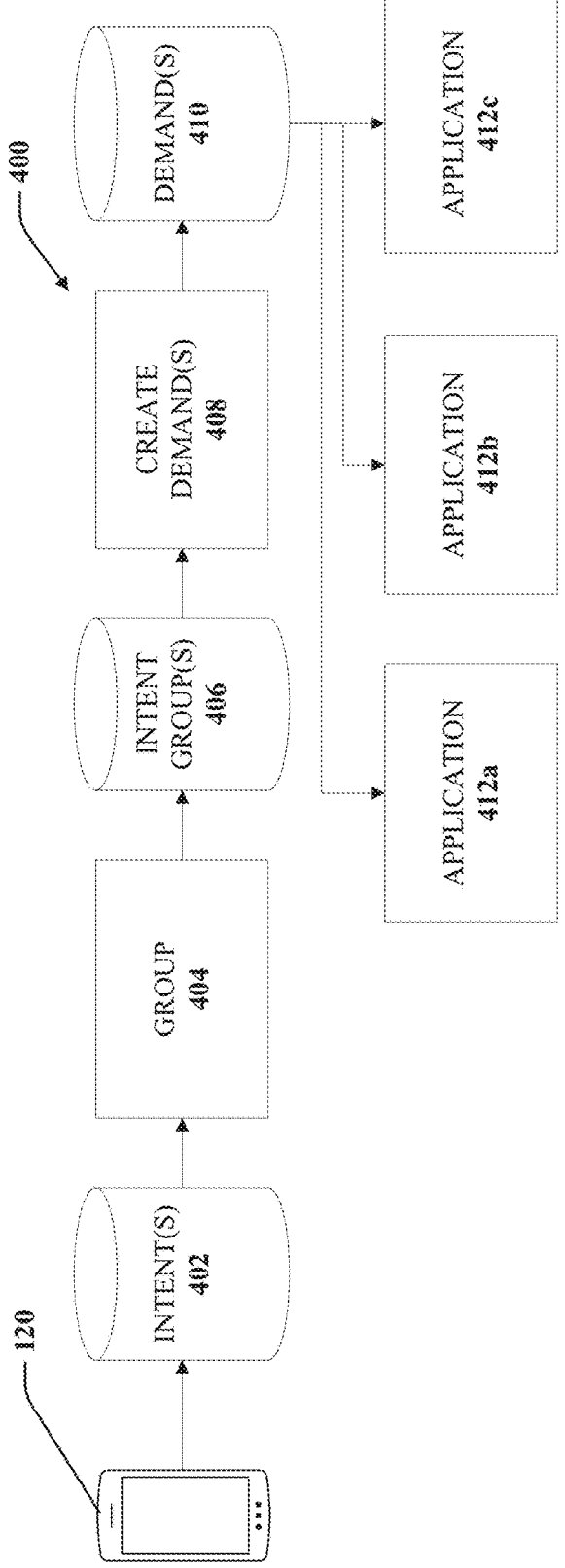
FIG. 4a illustrates a block flow diagram for a process associated with vehicle sharing service optimization in accordance with one or more embodiments described herein.
FIG. 4b illustrates a data table associated with a process for vehicle sharing service optimization in accordance with one or more embodiments described herein.

FIG. 4a illustrates an example, non-limiting block flow diagram 400 for a process associated with vehicle sharing service optimization in accordance with one or more embodiments described herein. For instance, intents collected via mobile device 120 can be compiled (e.g., via the intent grouping component 110 or another component herein) in data storage 402 (e.g., in the intent column of data table 414 stored in memory 104). At 404, the intents can be grouped (e.g., using the intent grouping component 110) into intent groups 406 (e.g., using the defined intent grouping algorithm). At 408, the demand component 112 can generate demands and store the demands in data storage 410 (e.g., the demand column of data table 414 stored in memory 104). From the demand, various applications 412a, 412b, 412c, etc. can be executed by the system 302 or another system herein. For example, dependability metric(s) can be calculated (e.g., via the quality component 310), journey(s) can be scheduled (e.g., via the journey component 204), pricing can be determined (e.g., via the pricing component 206), vehicles can be allocated (e.g., via the allocation component 306), or other suitable applications can be executed.

Figure 5:
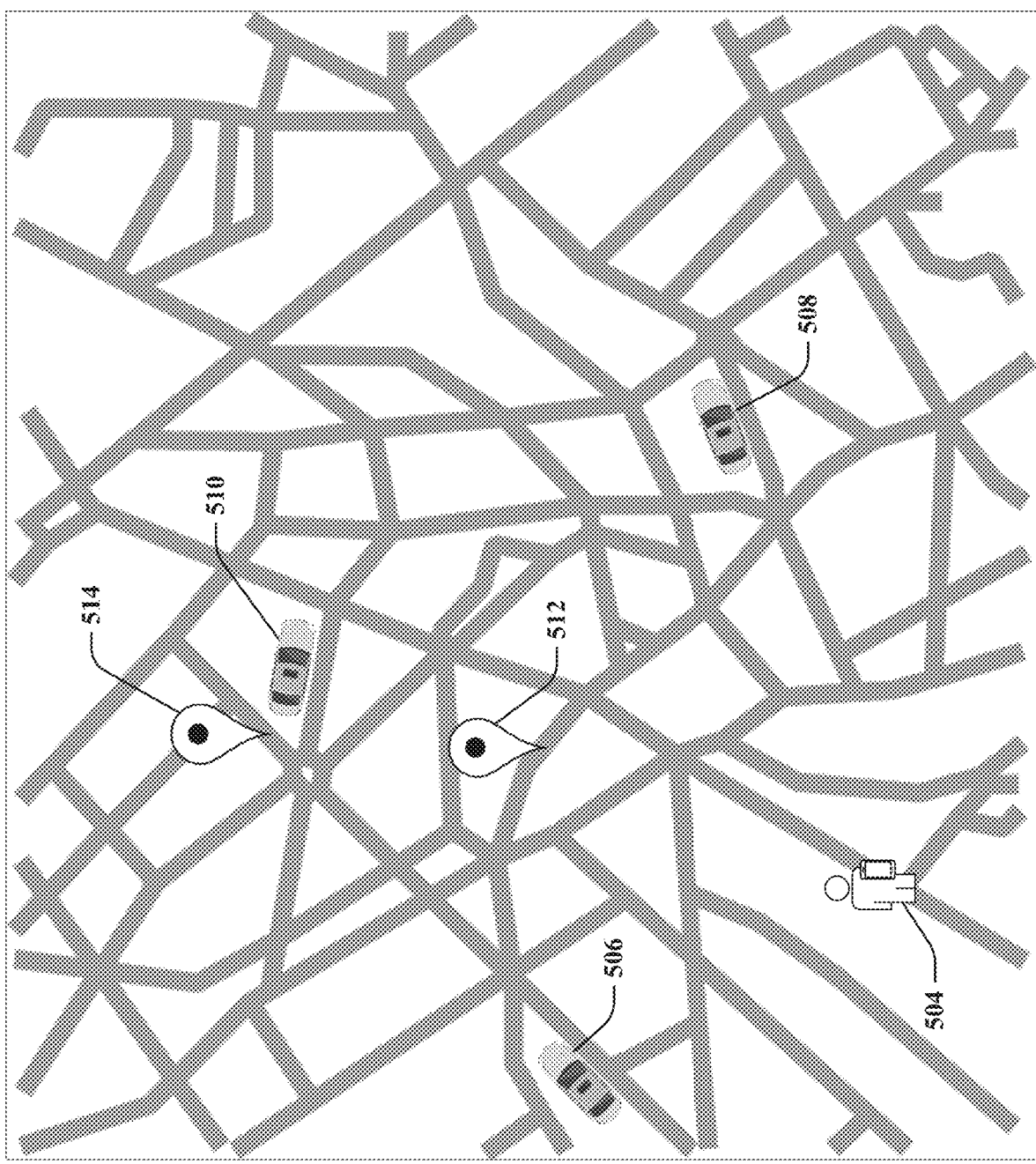
FIG. 5 illustrates a depiction of an example, non-limiting map in accordance with one or more embodiments described herein.

FIG. 5 illustrates a depiction of an example, non-limiting map 502 in accordance with one or more embodiments described herein. In various embodiments, a visualization of the map 502 can be generated on a mobile device 120 (e.g., the output component 114) or transmitted (e.g., via the communication component 116) over the network 118. In an implementation, the map 502 can represent an allocation of vehicles in a vehicle sharing service associated with a system herein. In other implementations, the map 502 can represent options for a user to generate a request (e.g., an intent) to schedule a vehicle herein. In map 502, a user location (e.g., and corresponding mobile device 120) are depicted as user 504. A start location (e.g., represented in an intent and/or a demand) is depicted at location 512. Likewise, an end location (e.g., represented in an intent and/or a demand) is depicted at location 514. Vehicle 506, vehicle 508, and vehicle 510 can comprise participant vehicles in a corresponding vehicle sharing service.

Figure 6:
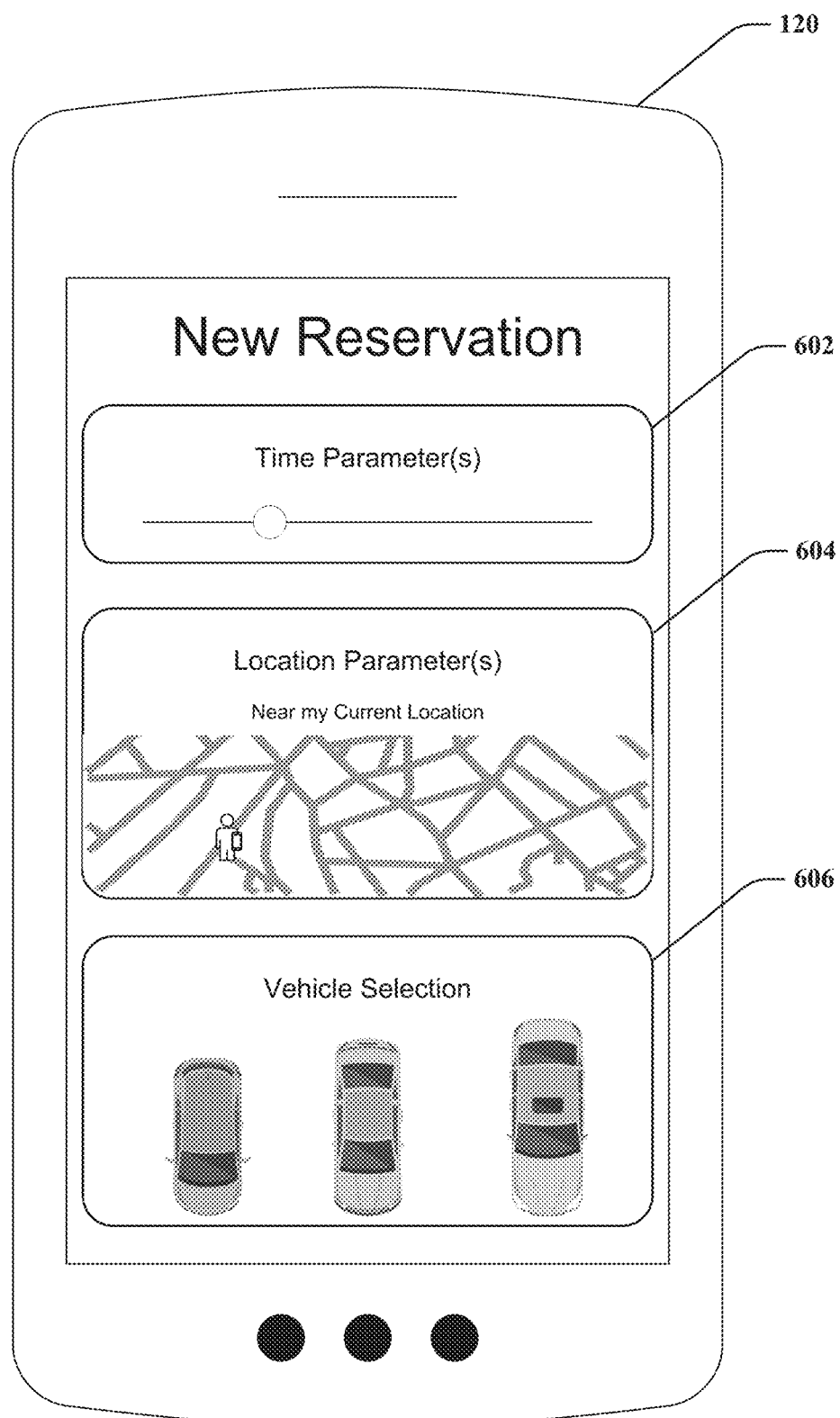
FIG. 6 illustrates a depiction of an example, non-limiting mobile device in accordance with one or more embodiments described herein.

FIG. 6 illustrates a depiction of an example, non-limiting mobile device 120 in accordance with one or more embodiments described herein. In various embodiments, the mobile device 120 can be utilized to gather an intent of a user and provide the intent to a system herein. For instance, the mobile device 120 can capture time parameters 602, location parameters 604, and/or vehicle selection 606, among other suitable parameters described herein. Such parameters can be presented to a user via the mobile device 120 so that the parameters can be user configured (e.g., within defined applicable limits). After a selection is made, the mobile device 120 can provide the selections (e.g., intent(s)) to a system herein.

Figure 7:
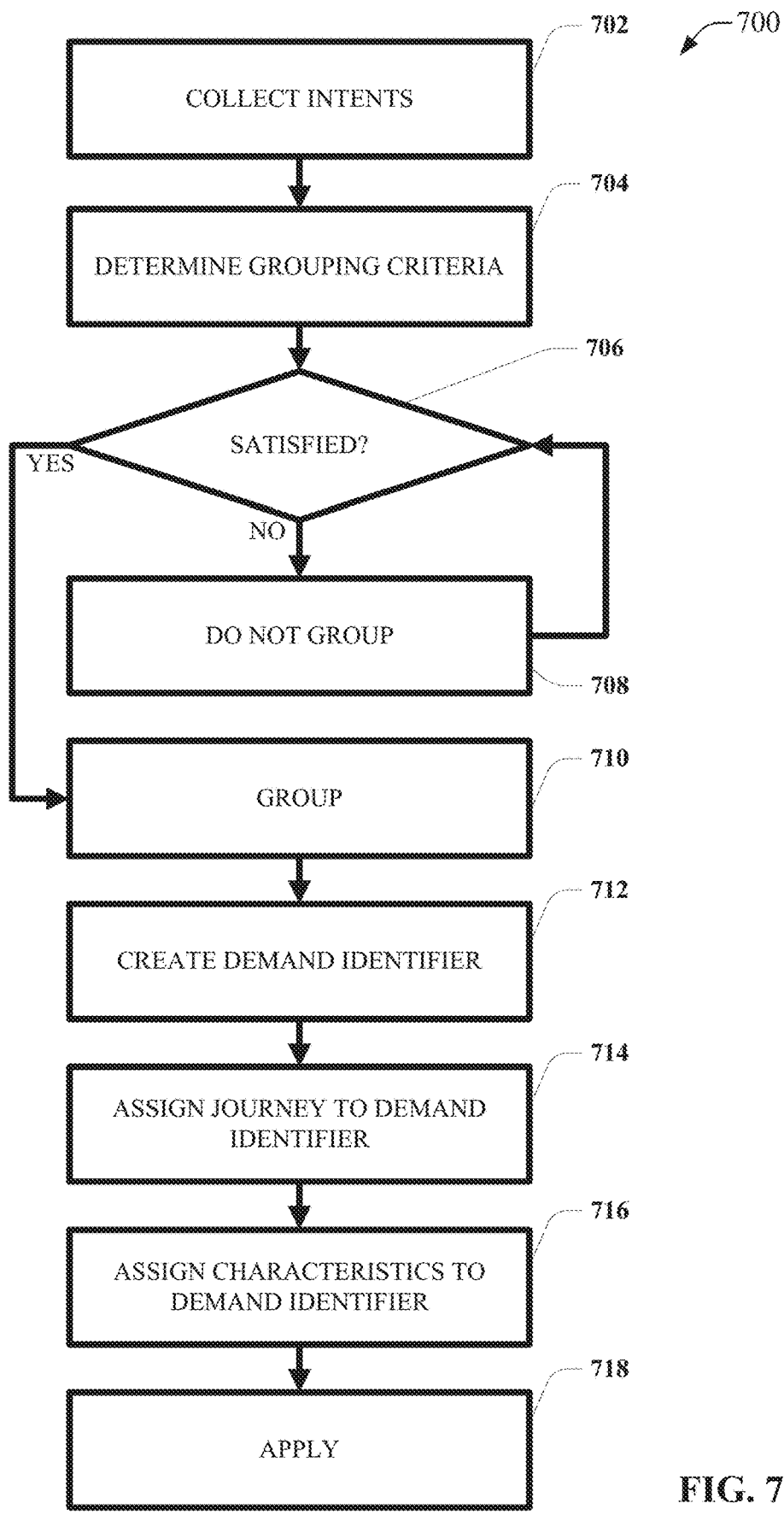
FIG. 7 is an exemplary flowchart of a process associated with vehicle sharing service optimization in accordance with one or more embodiments described herein.

Turning now to FIG. 7, there is illustrated a flowchart of a process 700 relating to vehicle sharing service optimization in accordance with one or more embodiments described herein. At 702 intents can be collected, accessed, and/or received (e.g., via a communication component 116) (e.g., from a mobile device 120). At 704, intent grouping criteria can be determined (e.g., via the intent grouping component 110). For example, the intent grouping component 110 can apply defined intent grouping rules or can utilize an intent grouping algorithm described herein. In some embodiments, the intent grouping algorithm can be generated via the M.L. component 304 based on past intents of other users, other than the user. At 706, if an intent satisfies grouping criteria or a grouping algorithm (e.g., Y at 706), the intent grouping component can incorporate that particular intent in an intent group at 710. If at 706, an intent does not satisfy grouping criteria or a grouping algorithm (e.g., N at 706), the intent grouping component 110 can prevent incorporate that particular intent in an intent group at 708, and attempt to incorporate the intent into a different intent group and/or generate a new intent group. At 712, the demand component 112 can generate a demand identifier for an intent group. Further, the demand component 112 can, based on the intents of the intent group and using a defined demand algorithm, determine a demand of the user. In this regard, the demand can comprise one or more parameters representative of a need, of the user, for the vehicle (e.g., vehicle 122). At 714, the journey component 204 can assign a journey to a demand identifier. In this regard, the journey component 204 can complete one or more user requests (e.g., intents) to schedule an appointment to use a vehicle (e.g., vehicle 122) of a vehicle sharing service. The journey component 204 can thus schedule a particular vehicle, start time, end time, start location, end location based on one or more demands determined via the demand component 112 for a particular vehicle of a fleet of vehicles (e.g., a fleet of vehicles comprising one or more of vehicle 122). At 716, the characteristic component 208 can assign one or more characteristics of an intent, from the intent group, to the demand. In an example, the intent can comprise a chronologically first intent from the intent group of which corresponding characteristics are applied to the corresponding demand. For instance, in data table 414 in FIG. 4b, characteristics of intent 3753 (e.g., start time 2:05, end time 3:00, city A, vehicle start location at main street, vehicle end location at main street) can be applied to demand 1001. At 718, one or more other applications can be (optionally) executed. For example, dependability metric(s) can be calculated (e.g., via the quality component 310), pricing can be determined (e.g., via the pricing component 206), vehicles (e.g., vehicle 122, vehicle 506, vehicle 508, vehicle 510, etc.) can be allocated as described herein (e.g., via the allocation component 306), or other suitable applications can be executed at 718.

Figure 8:
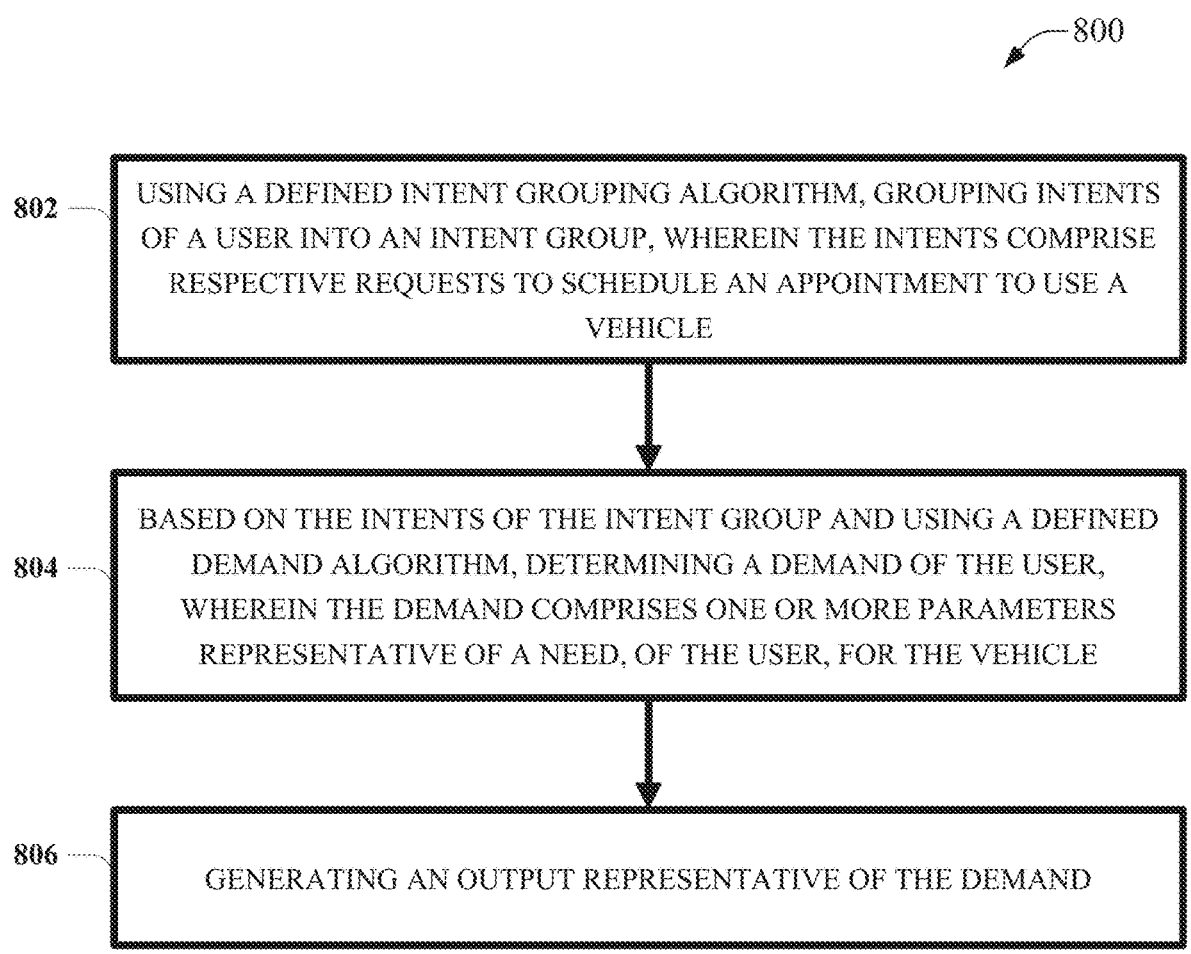
FIG. 8 illustrates a block flow diagram for a process associated with vehicle sharing service optimization in accordance with one or more embodiments described herein.

FIG. 8 illustrates a block flow diagram for a process 800 associated with vehicle sharing service optimization in accordance with one or more embodiments described herein. At 802, the process 800 can comprise, using a defined intent grouping algorithm, grouping (e.g., via the intent grouping component 110) intents of a user into an intent group, wherein the intents comprise respective requests to schedule an appointment to use a vehicle (e.g., vehicle 122, vehicle 506, vehicle 508, vehicle 510, etc.). At 804, the process 800 can comprise, based on the intents of the intent group and using a defined demand algorithm, determining (e.g., via the demand component 112) a demand of the user, wherein the demand comprises one or more parameters representative of a need, of the user, for the vehicle. At 806, the process 800 can comprise generating (e.g., via the output component 114) an output representative of the demand.

Systems described herein can be coupled (e.g., communicatively, electrically, operatively, optically, inductively, acoustically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, inductively, acoustically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, VHF, UHF, AM, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, L-band voice or data information, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction (s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 302 or any other system or device described herein) can comprise a computing device, a general-purpose computer, field-programmable gate array, AI accelerator application-specific integrated circuit, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, wearable device, internet of things device, a cell phone, a smart phone, a consumer appliance and/or instrumentation, an industrial and/or commercial device, a digital assistant, a multimedia Internet enabled phone, a multimedia players, and/or another type of device.

Figure 9:
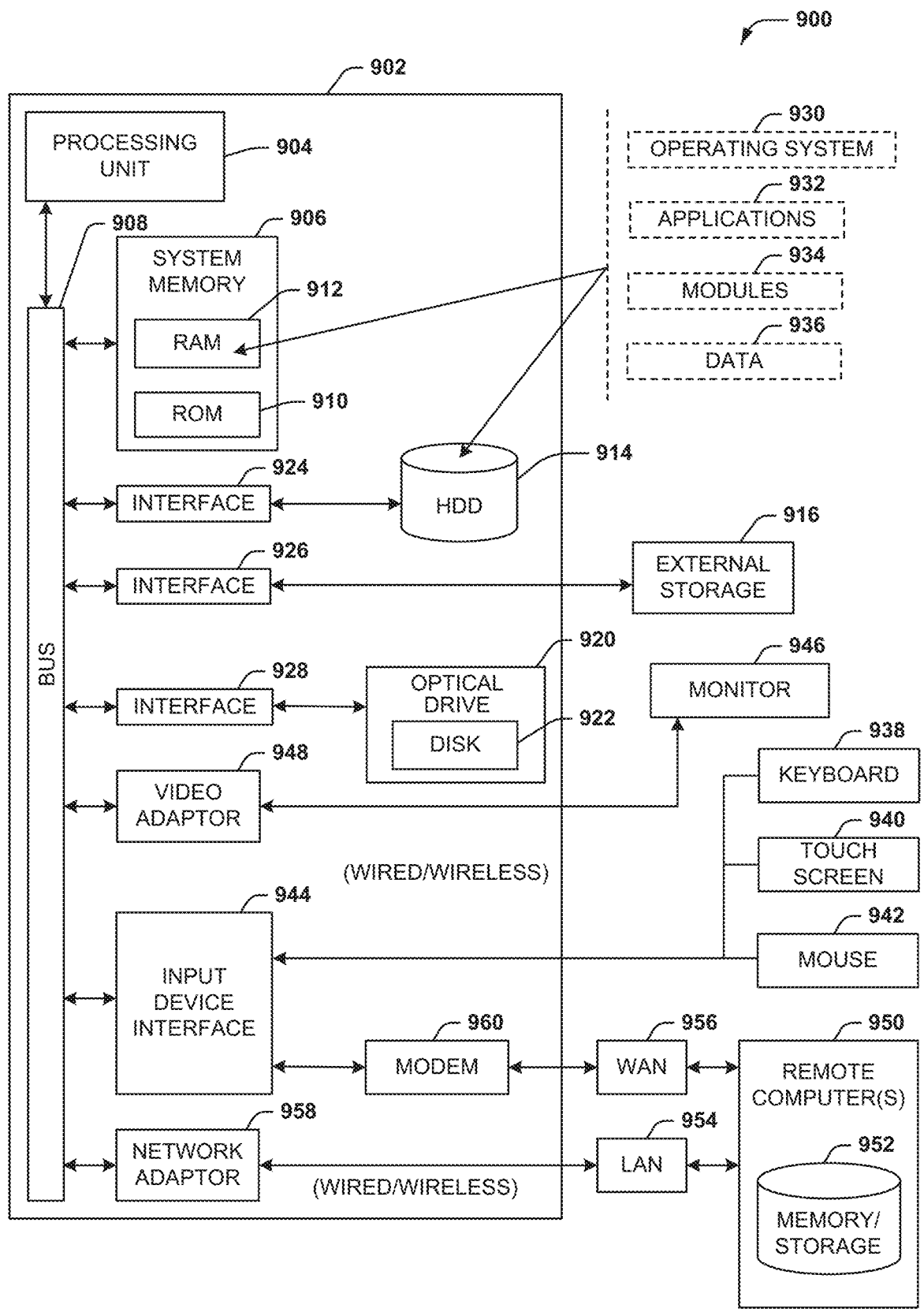
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers (e.g., ruggedized personal computers), field-programmable gate arrays, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, optic, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, field-programmable gate array, AI accelerator application-specific integrated circuit, or other suitable processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data. It is noted that unified Extensible Firmware Interface(s) can be utilized herein.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems, cloud computing systems, and/or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
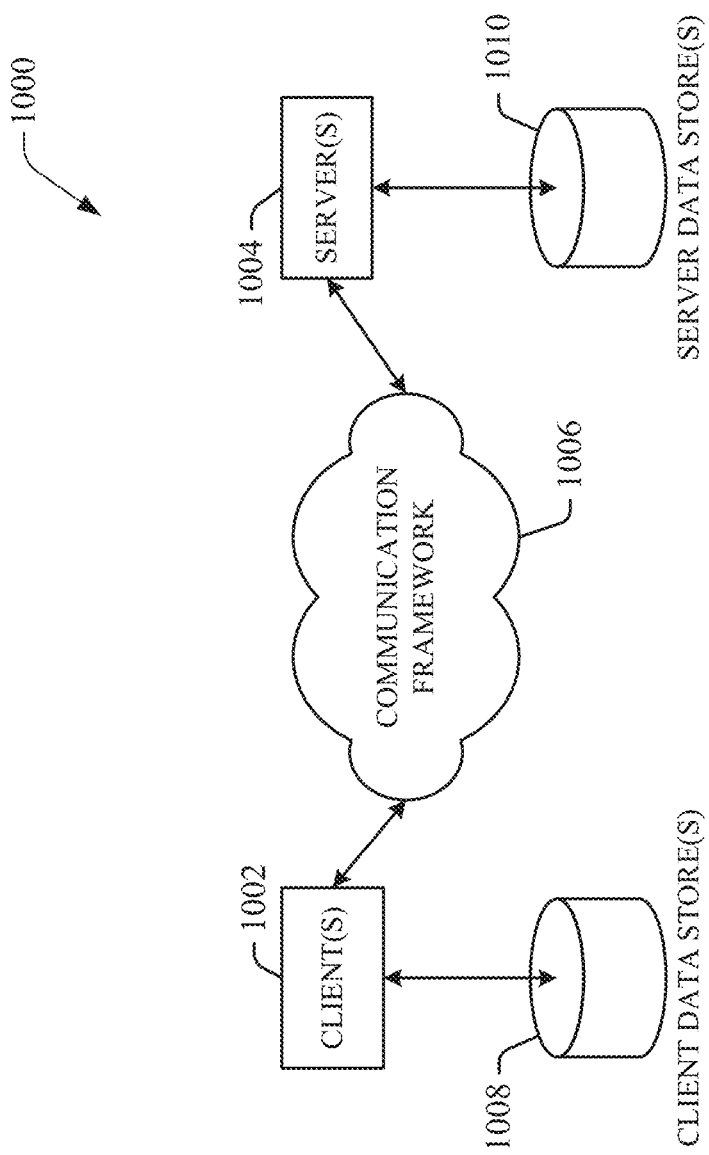
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004. Further, the client(s) 1002 can be operatively connected to one or more server data store(s) 1010.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising:
    a memory that stores computer executable components; and
    a processor that executes the computer executable components stored in the memory, wherein the computer executable components comprise:
    an intent grouping component that, using a defined intent grouping algorithm, groups intents of a user into an intent group, wherein the intents comprise respective requests to schedule an appointment to use a vehicle;
    a demand component that, based on the intents of the intent group and using a defined demand algorithm, determines a demand of the user, wherein the demand comprises one or more parameters representative of a need, of the user, for the vehicle; and
    an output component that generates an output representative of the demand.

2. The system of any preceding clause, wherein the computer executable components further comprise:
    a journey component that assigns a journey resulting from an intent, of the intent group, to the demand.

3. The system of any preceding clause, wherein the computer executable components further comprise:
    a characteristic component that assigns a characteristic of an intent, from the intent group, to the demand.

4. The system of any preceding clause, wherein the intent comprises a chronologically first intent from the intent group.
5. The system of any preceding clause, wherein the computer executable components further comprise:
   a machine learning component that generates, using machine learning, a characteristic model based on past characteristics of past intents of other users, other than the user, wherein the characteristic component assigns the characteristic of an intent to the demand using the characteristic model.
6. The system of any preceding clause, wherein the computer executable components further comprise:
   a machine learning component that generates, using machine learning, the defined intent grouping algorithm based on past intents of other users, other than the user.
7. The system of any preceding clause, wherein the computer executable components further comprise:
   a machine learning component that generates, using machine learning, the defined demand algorithm based on past demands of other users, other than the user.
8. The system of any preceding clause, wherein the computer executable components further comprise:
   an allocation component that, based on demands comprising the demand, determines an allocation of vehicles comprising the vehicle.
9. The system of any preceding clause, wherein the computer executable components further comprise:
   a machine learning component that, using machine learning based on past allocations of the vehicles, generates an allocation model, wherein the allocation component determines the allocation of vehicles using the allocation model.
10. The system of any preceding clause, wherein the computer executable components further comprise:
    a pricing component that, based on a group of demands comprising the demand and using a defined pricing algorithm, determines a price for appointment to use the vehicle.
11. The system of clause 1 above with any set of combinations of the systems 2-10 above.
12. A non-transitory machine-readable medium, comprising executable instructions that, when executed by a processor, facilitate performance of operations, comprising:
    using a defined intent grouping algorithm, grouping intents of a user into an intent group, wherein the intents comprise respective requests to schedule an appointment to use a vehicle;
    based on the intents of the intent group and using a defined demand algorithm, determining a demand of the user, wherein the demand comprises one or more parameters representative of a need, of the user, for the vehicle; and generating an output representative of the demand.
13. The non-transitory machine-readable medium of any preceding clause, wherein the one or more parameters comprise a start time and an end time for the appointment.
14. The non-transitory machine-readable medium of any preceding clause, wherein the one or more parameters comprise a type of vehicle.
15. The non-transitory machine-readable medium of any preceding clause, wherein the one or more parameters comprise a location for the vehicle.
16. The non-transitory machine-readable medium of any preceding clause, wherein the one or more parameters comprise a location of the user.
17. The non-transitory machine-readable medium of clause 12 above with any set of combinations of the non-transitory machine-readable mediums 13-16 above.
18. A method, comprising:
    using a defined intent grouping algorithm, grouping, by a system comprising a processor, intents of a user into an intent group, wherein the intents comprise respective requests to schedule an appointment to use a vehicle;
    based on the intents of the intent group and using a defined demand algorithm, determining, by the system, a demand of the user, wherein the demand comprises one or more parameters representative of a need, of the user, for the vehicle; and generating, by the system, an output representative of the demand.
19. The method of any preceding clause, wherein the intents of the user are received via a mobile device associated with the user.
20. The method of any preceding clause, further comprising:
    determining, by the system, a dependability metric associated with the demand, wherein the dependability metric comprises a ratio of demands comprising the demand to filled appointments comprising the appointment.
21. The method of any preceding clause, further comprising:
    assigning, by the system and using a characteristic model, a characteristic of an intent of the intent group to the demand, wherein the characteristic model has been generated using machine learning based on past characteristics of past intents of other users, other than the user.
22. The method of any preceding clause, further comprising:
    assigning, by the system, a journey resulting from an intent, of the intent group, to the demand.
23. The method of clause 18 above with any set of combinations of the methods of clauses 19-22 above.

What is claimed is:
1. A system, comprising:
a memory that stores computer executable components; and
a processor that executes at least one of the computer executable components that:
trains, using a historical database of past intents for shared vehicles, a machine learning model to determine demands of users for the shared vehicles, wherein the historical database comprises the past intents, past demands associated with the past intents, and past characteristics of the past intents, and wherein the training comprises:
for each past user:
  grouping past intents of a past user into groups, wherein the grouping comprises:
    based on ordering the past intents of the past user according to respective start times, determine respective differences in start times between the past intents of the past user, and determine respective differences in durations between the past intents of the past user; and for each pair of past intents:
for a pair of past intents satisfying a first criterion comprising the pair of past intents having a respective difference in start times being more than a first defined threshold or a respective difference in durations being more than a second defined threshold, and the pair of past intents not overlapping, group the pair of past intents with other pairs of past intents that satisfy the first criterion, and
for the pair of past intents satisfying a second criterion comprising the pair of past intents having the respective difference in start times not being more than the first defined threshold or the respective difference in durations being more than the second defined threshold, the pair of past intents not overlapping, and a ratio of durations of the pair of past intents being outside a defined range, group the pair of past intents with other pairs of past intents that satisfy the second criterion; and
for each group of past intents, determine a respective demand for the group based on the past characteristics of the past intents in the group;
groups, using the machine learning model, intents of a user into an intent group, wherein the intents comprise respective requests associated with scheduling an appointment to use a shared vehicle;
determines, using the machine learning model, based on the intents of the intent group, a demand of the user, wherein the demand comprises one or more parameters representative of a need, of the user, for the shared vehicle;
remotely controls an autonomous vehicle of the shared vehicles to drive to a defined location based on the demand; and
generates an output representative of the demand.

2. The system of claim 1, wherein the at least one of the computer executable components further:
assigns, using the machine learning model, a journey resulting from an intent, of the intent group, to the demand.

3. The system of claim 1, wherein the at least one of the computer executable components further:
assigns, using the machine learning model, a characteristic of an intent, from the intent group, to the demand.

4. The system of claim 3, wherein the intent comprises a chronologically first intent from the intent group.

5. The system of claim 3, wherein the machine learning model employs a characteristic model generated based on the past characteristics of the past intents to assign the characteristic of the intent to the demand.

6. The system of claim 1, wherein the at least one of the computer executable components further:
based on demands comprising the demand, determines, using the machine learning model, an allocation of a subset of the shared vehicles comprising the shared vehicle.

7. The system of claim 6, wherein the machine learning model employs an allocation model generated based on past allocations of the shared vehicles to determine the allocation of the subset of the shared vehicles using the allocation model.

8. A non-transitory machine-readable medium, comprising executable instructions that, when executed by a processor, facilitate performance of operations, comprising:
training, using a historical database of past intents for shared vehicles, a machine learning model to determine demands of users for the shared vehicles, wherein the historical database comprises the past intents, past demands associated with the past intents, and past characteristics of the past intents, and wherein the training comprises:
for each past user:
grouping past intents of a past user into groups, wherein the grouping comprises:
based on ordering the past intents of the past user according to respective start times, determining respective differences in start times between the past intents of the past user, and determining respective differences in durations between the past intents of the past user; and
for each pair of past intents of the past user:
for a pair of past intents satisfying a first criterion comprising the pair of past intents having a respective difference in start times being more than a first defined threshold or a respective difference in durations being more than a second defined threshold, and the pair of past intents not overlapping, grouping the pair of past intents with other pairs of past intents that satisfy the first criterion, and
for the pair of past intents satisfying a second criterion comprising the pair of past intents having the respective difference in start times not being more than the first defined threshold or the respective difference in durations being more than the second defined threshold, the pair of past intents not overlapping, and a ratio of durations of the pair of past intents being outside a defined range, grouping the pair of past intents with other pairs of past intents that satisfy the second criterion; and
for each group of past intents, determining a respective demand for the group based on the past characteristics of the past intents in the group;
grouping, using the machine learning model, intents of a user into an intent group, wherein the intents comprise respective requests associated with scheduling an appointment to use a shared vehicle;
determining, using the machine learning model, based on the intents of the intent group, a demand of the user, wherein the demand comprises one or more parameters representative of a need, of the user, for the shared vehicle;
remotely controlling an autonomous vehicle of the shared vehicles to drive to defined location based on the demand; and
generating an output representative of the demand.

9. The non-transitory machine-readable medium of claim 8, wherein the operations further comprise assigning, using the machine learning model, a journey resulting from an intent, of the intent group, to the demand.

10. The non-transitory machine-readable medium of claim 8, wherein the operations further comprise assigning, using the machine learning model, a characteristic of an intent, from the intent group, to the demand.

11. The non-transitory machine-readable medium of claim 10, wherein the intent comprises a chronologically first intent from the intent group.

12. The non-transitory machine-readable medium of claim 8, wherein the operations further comprise, based on demands comprising the demand, determining, using the machine learning model, an allocation of a subset of the shared vehicles comprising the shared vehicle.

13. A method, comprising:
training, by a system comprising a processor, using a historical database of past intents for shared vehicles, a machine learning model to determine demands of users for the shared vehicles, wherein the historical database comprises the past intents, past demands associated with the past intents, and past characteristics of the past intents, and wherein the training comprises:
for each past user:
grouping past intents of a past user into groups, wherein the grouping comprises:
based on ordering the past intents of the past user according to respective start times, determining respective differences in start times between the past intents of the past user, and determining respective differences in durations between the past intents of the past user; and
for each pair of past intents of the past user:
for a pair of past intents satisfying a first criterion comprising the pair of past intents having a respective difference in start times being more than a first defined threshold or a respective difference in durations being more than a second defined threshold, and the pair of past intents not overlapping, grouping the pair of past intents with other pairs of past intents that satisfy the first criterion, and
for the pair of past intents satisfying a second criterion comprising the pair of past intents having the respective difference in start times not being more than the first defined threshold or the respective difference in durations being more than the second defined threshold, the pair of past intents not overlapping, and a ratio of durations of the pair of past intents being outside a defined range, grouping the pair of past intents with other pairs of past intents that satisfy the second criterion; and
for each group of past intents, determining a respective demand for the group based on the past characteristics of the past intents in the group;
grouping, by the system, using the machine learning model, intents of a user into an intent group, wherein the intents comprise respective requests associated with scheduling an appointment to use a shared vehicle;
determining, by the system, using the machine learning model, based on the intents of the intent group a demand of the user, wherein the demand comprises one or more parameters representative of a need, of the user, for the shared vehicle;
remotely controlling, by the system, an autonomous vehicle of the shared vehicles to drive to defined location based on the demand; and
generating, by the system, an output representative of the demand.

14. The method of claim 13, wherein the intents of the user are received via a mobile device associated with the user.

15. The method of claim 13, further comprising:
determining, by the system, using the machine learning model, a dependability metric associated with the demand, wherein the dependability metric comprises a ratio of the demands comprising the demand to filled appointments.

16. The method of claim 13, further comprising:
assigning, by the system, using the machine learning model, a characteristic of an intent of the intent group to the demand.

17. The method of claim 16, wherein the intent comprises a chronologically first intent from the intent group.

18. The method of claim 13, further comprising:
assigning, by the system, using the machine learning model, a journey resulting from an intent, of the intent group, to the demand.

19. The method of claim 13, further comprising:
determining, by the system, using the machine learning model and based on the demands comprising the demand, an allocation of a subset of the shared vehicles comprising the shared vehicle.

20. The method of claim 19, wherein the machine learning model employs an allocation model generated based on past allocations of the shared vehicles to determine the allocation of the subset of the shared vehicles.

* * * * *